United States Patent Office 3,511,893
Patented May 12, 1970

3,511,893
POLYAMIDES BLOCK COPOLYMERS WITH CAPROLACTAM AND CAPRYLACTAM
Paul R. Schaeffer, West Chester, and Norman E. Steely, Reading, Pa., assignors to The Polymer Corporation, a corporation of Pennsylvania
No Drawing. Filed July 31, 1967, Ser. No. 657,032
Int. Cl. C08g *41/04, 22/00*
U.S. Cl. 260—858                2 Claims

ABSTRACT OF THE DISCLOSURE

Soft, elastomeric or rubber-like polyamides are prepared by copolymerizing a polyurethane that has free isocyanate groups with at least two different lactams in the presence of an anionic polymerization catalyst.

---

This invention relates to novel polyamides that are soft and rubber-like and to methods for their preparation.

Of the many synthetic resinous fiber- and film-forming materials commonly available, the polyamides are well known for their properties of toughness, abrasion-resistance, comparative inertness from chemical attack, and their low coefficients of friction. These polyamides are generally quite hard and horny and are comparatively inelastic. Due to these unique properties, the polyamides have been used for many industrial purposes such as coatings, bearings, cams, gears, and various other machine parts where properties of abrasion-, wear- and chemical-resistance are important. However, in those applications where a softer, somewhat elastic material is desired, the polyamides do not have the requisite properties.

Accordingly, it is an object of this invention to provide polyamides that are soft and rubber-like.

Another object of this invention is to prepare rubber-like polyamides that maintain their desirable properties of wear, abrasion-resistance, and inertness to chemical attack.

A further object of this invention is to provide polymerization processes whereby soft, rubber-like polyamides can be prepared without substantially affecting their desirable properties of resistance to wear, abrasion, and chemical attack.

Briefly, these and other objects of this invention are achieved by copolymerizing a polyurethane that has free isocyanate groups with at least two different lactams in the presence of an anionic polymerization catalyst. By these means, novel polyamide materials are achieved that are soft and rubbery, yet substantially retain their properties of long wear, resistance to abrasion, and general resistance to attack from many chemicals.

THE POLYMERIZATION SYSTEM

This invention finds particular utility in the polymerization of lactams that can be initiated at temperatures of the order of about 80° C. and higher, and generally below the melting point of the resulting polylactam, by the anionic polymerization of such lactams in the presence of specific promoter compounds such as N-substituted imides (e.g., N-acyl lactams, cyclic imides of dicarboxycyclic acids, etc., N-acyl sulfonamides, disulfonamides, N-nitroso amides, N-nitroso sulfonamides, and various thioacyl analogs, isocyanates, and N,N′-disubstituted and trisubstituted ureas and thioureas). These polymerization processes are discussed more completely in U.S. Pats. 3,017,391; 3,028,369; and 3,086,962. As will be discussed in more detail below, the polyurethanes utilized in the polymerizations of this invention may function as suitable promoter compounds.

THE CATALYST SYSTEM

Suitable catalysts in the anionic polymerization of higher lactams are any of the metals, which can be in metallic, complex ion or compound form, that are capable of forming lactam salts (e.g., sodium and caprolactam to form sodium caprolactam). Common examples of such catalysts suitable for the anionic ploymerization of the higher lactams are the alkali and alkaline earth metals, e.g., sodium, potassium, lithium, calcium, strontium, barium, magnesium, etc., either in metallic form or in the form of hydrides, borohydrides, oxides, hydroxides, carbonates, etc. However, in the case of compounds such as the hydroxides and carbonates which give off water when reacted with lactams, the bulk of such water preferably is removed from the polymerization by, for example, the application of heat and/or reduced pressure before the base-catalyzed polymerization is effected. Thus, it is preferable that the reaction systems be maintained in a substantially anhydrous condition.

Other effective catalysts are the organo-metallic derivatives of the foregoing metals, as well as of other metals. Examples of such organo-metallic compounds are the lithium, potassium and sodium alkyls such as butyl lithium, ethyl potassium or propyl sodium, or the aryl compounds of such metals such as sodium phenyl, triphenylmethyl sodium and the like. Other suitable organo-metallic compounds are diphenyl magnesium, zinc diethyl, triisopropyl aluminum, diisobutyl hydride, etc.

As a general class, the materials known as Grignard reagents are also effective base catalysts for the present polymerization. Typical of such Grignard catalysts are ethyl magnesium chloride, methyl magnesium bromide, phenyl magnesium bromide and the like. Other suitable anionic polymerization catalysts are sodium amide, magnesium amide and magnesium anilide, as well as numerous others.

The catalyst concentration employed in the instant process may vary from a small fraction of 1 mole percent, e.g., from about 0.01 mole percent, to as much as 15 to 20 mole percent, based on the lactam monomer. In general, however, the preferred catalyst concentrations will vary from about 0.05 to about 5 mole percent, and more preferably still, from about 0.1 to about 1 mole percent.

THE LACTAMS

The lactams useful in this invention are those that may generally be classed as the higher lactams that contain at least 3 carbon atoms in the lactam ring. These higher lactams are useful in that they may readily be polymerized in the low temperature polymerization processes. These polymerizations take place with rapidity and, particularly when conducted at temperatures below the melting point of the resulting polylactams, result in a high conversion (e.g., at least 95%) from monomer to polymer.

The higher lactams with which this invention is concerned may be generally illustrated by the formula:

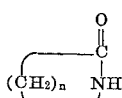

wherein $n$ is an integer of at least 2 and up to 15, and preferably wherein $n$ is an integer from 5 to about 12.

As previously mentioned, it is one aspect of this invention that more than one lactam be used in the polymerization. It has generally been observed that when several lactams are copolymerized, improved rubber-like and/or elastomeric properties are noted. While it has not been definitely established, it is believed that these improved rubber-like properties result from the fact that by utilizing at least two different lactams in the polymerization, the interference caused by using lactams having different numbers of carbon atoms prevents the formation of an ordered crystalline structure. Accordingly, since an ordered crystalline structure is avoided, the resulting polymerization product will have greater rubber-like or elastomeric properties.

THE POLYURETHANES

The polyurethanes that are useful in the practice of this invention are those having free isocyanate groups. Each of these free isocyanate groups may react with a lactam monomer to form N-substituted imide that will act as a promoter for the low temperature anionic polymerizations. Essentially, then, these free isocyanate groups form active sites onto which polylactam chains may be polymerized. This results in a product that has a complex, disordered, essentially non-crystalline structure that is comprised of a plurality of different lactams that have been polymerized onto a polyurethane backbone. Thus, it can be understood that not only are the resulting copolymers made rubbery and elastomeric due to the use of the several lactams, but also the elastomeric nature of the polyurethanes per se also contribute to the formation of the soft, rubber-like or elastomeric copolymerization products.

In order to obtain a suitable polyurethane having active isocyanate groups, it is convenient to react a polyisocyanate with a compound having a reactive hydrogen atom such as, for example, polyethers, polyesters, castor oils, glycols and amines. A particularly preferred group of polyurethanes are those prepared by the reaction of a diisocyanate with a polyalkaline ether glycol, commercially available under the trade name "Adiprene" as sold by Du Pont de Nemours & Co. Typically, these materials may have from about 4% to about 10% by weight of active isocyanate groups.

More generally, the polyurethanes useful in the practice of this invention may be illustrated by the following general formula:

wherein R and $R_1$ are selected from the group consisting of hydrocarbyl, i.e., monovalent hydrocarbon radicals free from non-benzenoid unsaturation, such as alkyl, cycloalkyl, aralkyl, aryl, alkaryl, preferably containing from 1 to 20 carbon atoms, and more preferably still, containing from 1 to 12 carbon atoms, divalent hydrocarbon radicals free from non-benzenoid unsaturation, and various substituents contained in such radicals; and X is selected from the group consisting of oxygen and sulfur.

The quantity of the polyurethane employed in the instant anionic polymerization can be varied over a relatively large range varying from about 0.05 to about 50 mole percent, considered as isocyanate functionality based on the higher lactam. It will be understood that the rubber-like or elastomeric properties of the resulting copolymer will be increased with increasing quantities of the polyurethane, and at the lowest concentration of about 0.05, the polyurethane will do little more than act as a promoter for the polymerization reaction and will have comparatively little effect upon the properties of the copolymerized lactams. Stated somewhat differently, it is generally preferred to employ from about 2% to about 60% by weight of a polyurethane that has from about 1% to about 10% by weight active isocyanate groups, and more preferably, at least 10% by weight of a polyurethane that has at least 4% by weight active isocyanate groups.

In the following examples, various anionic polymerizations were conducted to illustrate the efficacy of this invention. In each instance, the catalyst was prepared by prereacting sodium hydride with epsilon-caprolactam to form sodium epsilon-caprolactam. Due to the rubbery nature of some of the products prepared, it was difficult to machine suitable samples for obtaining values of modulus of elasticity, and instead, the soft rubbery nature of the product was measured by determining the hardness of the product on the D scale of a Shore Durometer.

Example I

1/200 mole of tolylene diisocyanate as an initiator was added to epsilon-caprolactam. The mixture was heated to about 160° C. and a 5/1600 molar quantity of sodium caprolactam was added. The polymerization rapidly carried to completion, and after cooling, the polymerized product was found to have a Shore Durometer D hardness of 85.

Example II

A mixture was prepared containing 90% by weight e-caprolactam and 10% by weight of a polyurethane prepared by the reaction of a diisocyanate with a polyalkaline ether glycol having about 4.3% by weight active isocyanate groups (Adiprene L–100). The mixture was heated to 160° C. and 5/1600 molar quantity of sodium caprolactam catalyst was added. The polymerization went rapidly to completion, and after the product was cooled to room temperature, the Shore Durometer D hardness was determined to be 77.

Example III

A mixture was prepared containing 80% by weight e-caprolactam and 20% by weight of a polyurethane prepared by the reaction of a diisocyanate and a polyalkaline ether glycol having about 4.3 weight percent active isocyanate groups (Adiprene L–100). The mixture was heated to a temperature of 160° C. and a 5/800 molar quantity of a sodium caprolactam catalyst was added. The reaction carried rapidly to completion, and after the product had cooled, the polymerization product was determined to have a Shore Durometer D hardness of 65.

Example IV

A mixture comprised of 90% e-caprolactam and 10% by weight of a polurethane prepared by the reaction of a diisocyanate and a polyalkaline ether glycol having about 9% active isocyanate groups by weight was prepared and heated to a temperature of about 160° C. 1/200 molar quantity of sodium caprolactam catalyst was added. The reaction proceeded rapidly to completion and, after cooling, the polymerized product was determined to have a Shore Durometer D hardness of about 70.

Example V

A mixture comprised of 20% by weight caprylactam, 60% by weight caprolactam, and 20% by weight of a polyurethane prepared by reacting a diisocyanate with a polyalkaline ether glycol having about 4.3 weight percent active isocyanate groups (Adiprene L–100) was prepared and heated to a temperature of about 160° C. 3/400 molar quantity of a sodium caprolactam catalyst was added and the reaction proceeded rapidly to completion. After solidification and cooling to room temperature, the polymerized product was found to have a Shore Durometer D hardness of 30.

From the foregoing, it can be seen that the hardness of the polymerization product was somewhat reduced when a lactam monomer was polymerized in the presence of a polyurethane but greatly reduced when two different lactams were used. The two lactams used were caprolactam and caprylactam primarily due to the fact that the caprolactam is the most readily available and the caprylactam is extremely easy to polymerize and will yield products in which the conversion from monomer to polymer is 99+%. From the above examples it can be seen that when only a single lactam was polymerized with a polyurethane Shore hardnesses in excess of about 60 were obtained. On the other hand, however, when a second lactam was included, Shore hardnesses materially less than about 60 were obtained without difficulty.

Additional experiments were made and it was found that the softness of the produce could be varied, to some extent, by varying the initiation temperatures. Quite generally, it was found that softer products were prepared when polymerizations were initiated at low temperatures, i.e., below about 130° C., than was the case when higher temperatures, e.g., 160° C., were used as the initiation temperatures.

The quantities of the lactams and polyurethanes to be included are not critical and they can vary over a wide range depending upon the ultimate physical properties desired. Quite generally, it may be said that at least 5% by weight, and usually at least 10% by weight, of each lactam may desirably be included in the polymerizable mixture. With regard to the polyurethane, it has been previously noted that it can vary over a large range of from about 2% to about 60% by weight, but preferably about 10% by weight may advantageously be used. On the other hand, in order to preserve most of the physical properties of the polylactam, it is generally preferred to use less than about 40% polyurethane, but this will depend, of course, on the desired properties of the product.

Although certain embodiments of this invention have been described in the specification, it is to be understood that the invention is not limited thereto, is capable of modification, and can be rearranged without departing from the spirit and scope of the invention.

We claim:

1. A soft, rubber-like polyamide block copolymer with a Shore Durometer D hardness of less than 60 comprising the copolymerization product of a polyurethane, caprolactam, and caprylactam; the polyurethane being a reaction product of a diisocyanate with a polyalkaline ether glycol and being present in about 20% by weight; the caprolactam being present in about 60% by weight; and the caprylactam being present in about 20% by weight.

2. A method for the preparation of soft, rubber-like polyamides having a Shore Durometer D hardness of less than 60 comprising the step of copolymerizing about 60% by weight caprolactam, 20% by weight caprylactam, and 20% by weight polyurethane, in which the polyurethane has the general formula:

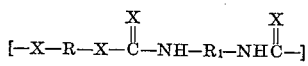

wherein R and $R_1$ are selected from the group consisting of hydrocarbyl, i.e., monovalent hydrocarbon radicals free from nonbenzenoid unsaturation, such as alkyl, cycloalkyl, aralkyl, aryl, alkaryl, preferably containing from 1 to 20 carbon atoms, and more preferably still, containing from 1 to 12 carbon atoms, divalent hydrocarbon radicals free from nonbenzenoid unsaturation, and various substituents contained in such radicals; and X is selected from the group consisting of oxygen and sulfur.

References Cited

UNITED STATES PATENTS

| | | | |
|---|---|---|---|
| 3,316,221 | 4/1967 | Hyde | 260—858 |
| 3,320,335 | 5/1967 | Hedrick | 260—858 |
| 3,397,185 | 8/1968 | Tetenbaum | 260—78 |

PAUL LIEBERMAN, Primary Examiner

U.S. Cl. X.R.

260—18, 75, 77.5, 78, 857